(12) United States Patent
Phoenix

(10) Patent No.: US 11,486,656 B2
(45) Date of Patent: Nov. 1, 2022

(54) VARIABLE CONDUCTIVITY METAMATERIALS AND THERMAL CONTROL SYSTEMS EMPLOYING THE SAME

(71) Applicant: The Government of the United States, as represented by the Secretary of the Navy, Washington, DC (US)

(72) Inventor: Austin Phoenix, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/820,412

(22) Filed: Mar. 16, 2020

(65) Prior Publication Data

US 2020/0217597 A1    Jul. 9, 2020

Related U.S. Application Data

(63) Continuation of application No. PCT/US2018/051358, filed on Sep. 17, 2018.
(Continued)

(51) Int. Cl.
*G05D 23/02* (2006.01)
*F28F 3/00* (2006.01)
(Continued)

(52) U.S. Cl.
CPC ............... *F28F 3/00* (2013.01); *G05D 23/02* (2013.01); *G05D 23/021* (2013.01);
(Continued)

(58) Field of Classification Search
CPC .. F28F 3/00; F28F 2013/001; F28F 2013/005; F28F 2013/006;
(Continued)

(56) References Cited

U.S. PATENT DOCUMENTS

| 4,676,300 | A | * | 6/1987 | Miyazaki | B64G 1/50 165/104.14 |
| 4,909,313 | A | * | 3/1990 | Voss | F28F 13/00 165/46 |
| 5,535,815 | A | * | 7/1996 | Hyman | F28F 13/00 165/185 |
| 5,875,096 | A | * | 2/1999 | Gates | H01L 23/433 361/704 |
| 9,025,333 | B1 | * | 5/2015 | Spowart | F28F 13/00 361/704 |

(Continued)

FOREIGN PATENT DOCUMENTS

DE    4126227 A1 *  2/1993  .......... G05D 23/192

*Primary Examiner* — Devon Russell
(74) *Attorney, Agent, or Firm* — US Naval Research Laboratory

(57) ABSTRACT

Thermal control systems that include variable conductivity metamaterial units are provided. The metamaterial unit a plurality of thermally conductive plates, a plurality of first bonds, each of which connects two adjoining thermally conductive plates, and a plurality of second bonds, each of which connects two adjoining thermally conductive plates. Also included is a load inducer constructed to cause the plurality of thermally conductive plates to move between a non-contact state, in which opposing surfaces of the plurality of thermally conductive plates are not in direct contact, to a contact state, in which the opposing surfaces of the plurality of thermally conductive are in at least partial direct contact, so as to change a thermal conductivity of the metamaterial unit from a first value to a second value. Through the ability to design the effective thermal conductivity as a function of temperature a passive thermal control capability is achieved by the introduction of thermal stability regions that will passively ensure thermal stability.

14 Claims, 15 Drawing Sheets

Related U.S. Application Data

(60) Provisional application No. 62/559,372, filed on Sep. 15, 2017.

(51) Int. Cl.
  *G05D 23/185* (2006.01)
  *G05D 23/08* (2006.01)
  *F28F 13/00* (2006.01)

(52) U.S. Cl.
  CPC ........... *G05D 23/024* (2013.01); *G05D 23/08* (2013.01); *G05D 23/1852* (2013.01); *F28F 2013/001* (2013.01); *F28F 2013/008* (2013.01)

(58) Field of Classification Search
  CPC . F28F 2013/008; G05D 23/02; G05D 23/021; G05D 23/024; G05D 23/08; G05D 23/1852
  See application file for complete search history.

(56) References Cited

U.S. PATENT DOCUMENTS

| | | | | |
|---|---|---|---|---|
| 10,100,520 | B2* | 10/2018 | Abe | E04C 2/34 |
| 10,865,000 | B2* | 12/2020 | Newlin | B64G 1/50 |
| 2005/0074666 | A1* | 4/2005 | Kimiya | H01M 10/667 |
| | | | | 429/62 |
| 2009/0184798 | A1* | 7/2009 | Vaidyanathan | F25D 19/006 |
| | | | | 337/298 |
| 2010/0132925 | A1* | 6/2010 | Lewis | F28D 15/0275 |
| | | | | 165/104.26 |
| 2013/0081786 | A1* | 4/2013 | Clark | F28F 13/00 |
| | | | | 165/96 |
| 2017/0138677 | A1* | 5/2017 | Hull | F28F 13/14 |
| 2018/0209750 | A1* | 7/2018 | Im | G05B 15/02 |
| 2018/0216898 | A1* | 8/2018 | Ockfen | F42B 15/34 |
| 2018/0305043 | A1* | 10/2018 | Mindock | B64G 1/506 |

* cited by examiner

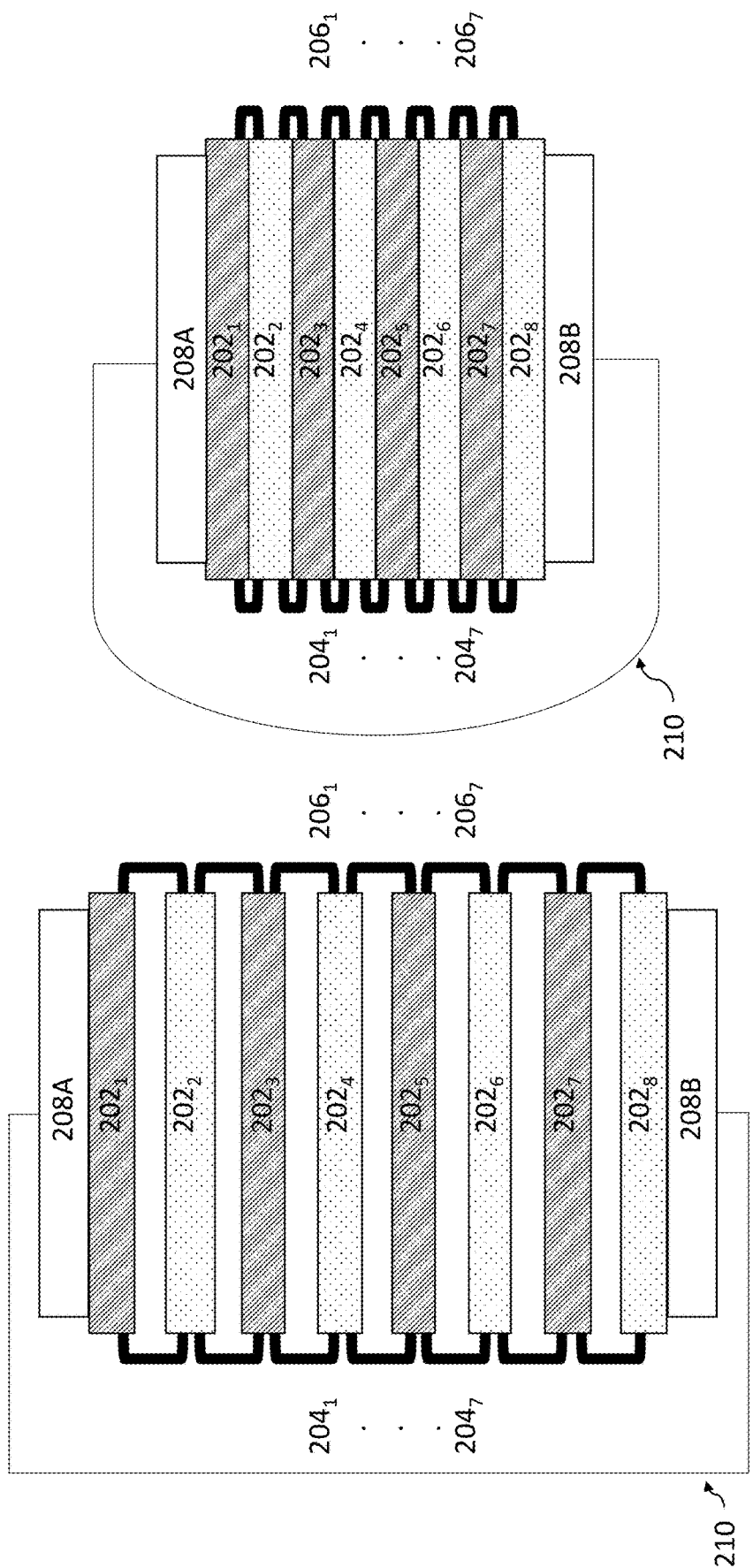

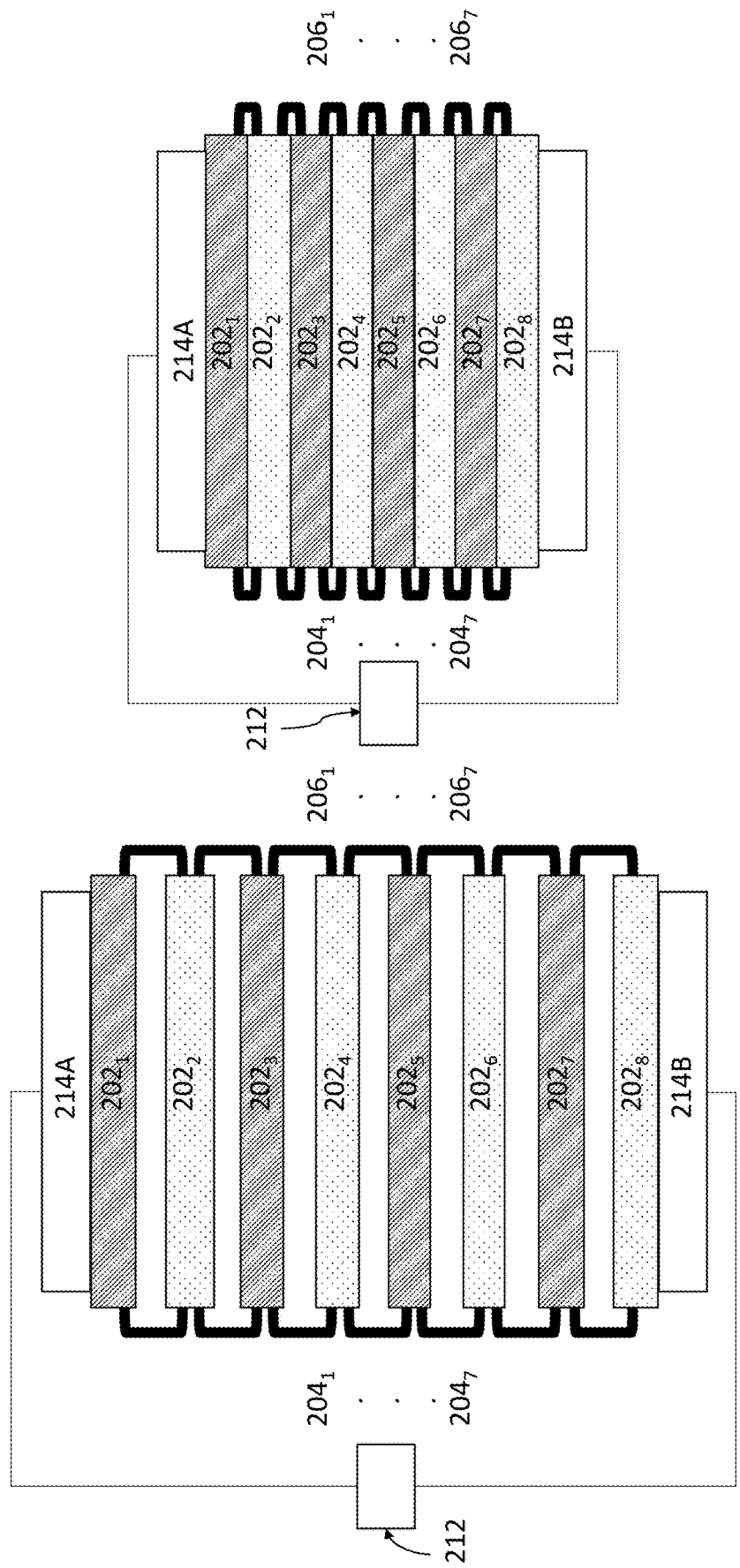

VARIABLE CONDUCTIVITY METAMATERIALS AND THERMAL CONTROL SYSTEMS EMPLOYING THE SAME

BACKGROUND

Field of the Invention

The present application relates generally to variable conductivity metamaterials and thermal control systems employing the same.

Description of Related Art

Thermal management is an important engineering consideration in several fields including, for example, spacecraft systems. Thermal management is principally concerned with the movement of heat from one location to another. Typically, to prevent an undesirable buildup of heat at any one location. A variety of systems currently exist to perform this function, including: thermal switches, thermal-electric coolers (TEC), and conventional metamaterials. Thermal switches operate in two states: on or off. When the thermal switch is on, heat is allowed to flow from one location to another. When the thermal switch is off, heat is prevented from flowing. This binary nature means there is a limited degree of control over how the heat in the system is moved from one location to another. TECs use the Peltier effect to move heat from one location to another. While TECs have a greater degree of control over how much heat is moved from location to another, that control comes at the expense of significant power requirements. In certain fields, power is a rare commodity. For example, spacecraft have a very limited amount of power available to them. Other drawbacks of TECs is that their control authority is fairly limited, and in general are fragile. Metamaterials are a relative new class of materials that are current being employed to address engineering problems. A metamaterial may be generally defined as a material or structure engineered at the micro level to generate macro or bulk material properties that are not found in nature. Static unchanging thermal metamaterials have been used to direct the flow of heat around an object. However, conventional metamaterials have not shown the ability to adapt their thermal conductivity to a changing environment. This lack of passive control capability has to date excluded metamaterials from being used to provide thermal control in a system. Thus, it would be beneficial to have a material or structure that exhibits both passive and active modes of operation, could respond to changes in temperatures, and required little power to operate compared to TECs.

SUMMARY OF THE INVENTION

One or more the above limitations may be diminished by structures and methods described herein.

In one embodiment, a thermal control system is provided. The control system includes a metamaterial unit that includes: a plurality of thermally conductive plates, a plurality of first bonds, wherein each first bond connects two adjoining thermally conductive plates, and a plurality of second bonds, wherein each second bond connects two adjoining thermally conductive plates. Also included is a load inducer constructed to cause the plurality of thermally conductive plates to move between a non-contact state, in which opposing surfaces of the plurality of thermally conductive plates are not in direct contact, to a contact state, in which the opposing surfaces of the plurality of thermally conductive are in at least partial direct contact, so as to change a thermal conductivity of the metamaterial unit from a first value to a second value.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2C is a cross-sectional view of a metamaterial unit and a load inducer in a non-contact state according to one embodiment.

FIG. 2D is a cross-sectional view of the metamaterial unit and load inducer shown in FIG. 2C in a full-contact state.

FIG. 2E is a cross-sectional view of a metamaterial unit and another load inducer according to one embodiment in a non-contact state.

FIG. 2F is a cross-sectional view of the metamaterial unit and load inducer shown in FIG. 2E in a full-contact state.

Figure 1A:
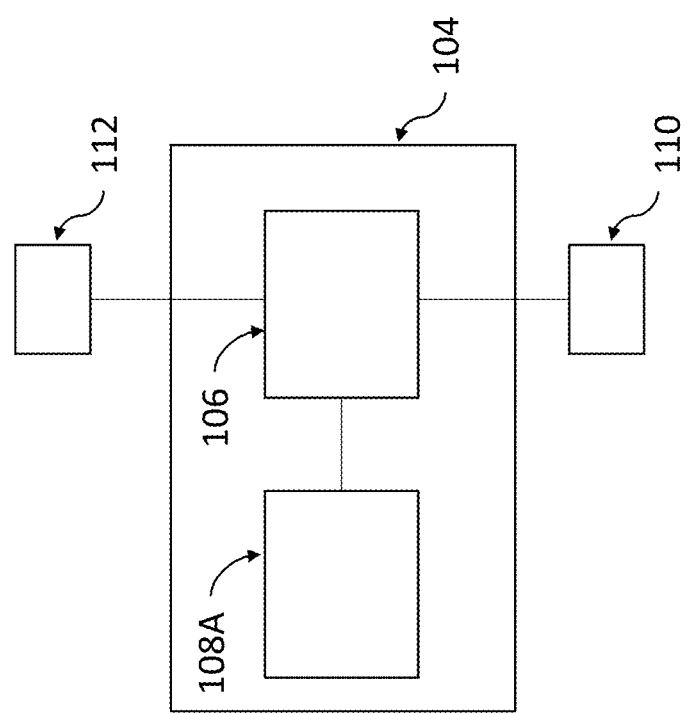
FIG. 1A is a schematic illustration of a thermal control system according to one embodiment.

Different Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are thermal control systems that employ variable conductivity metamaterials.

Figure 1B:
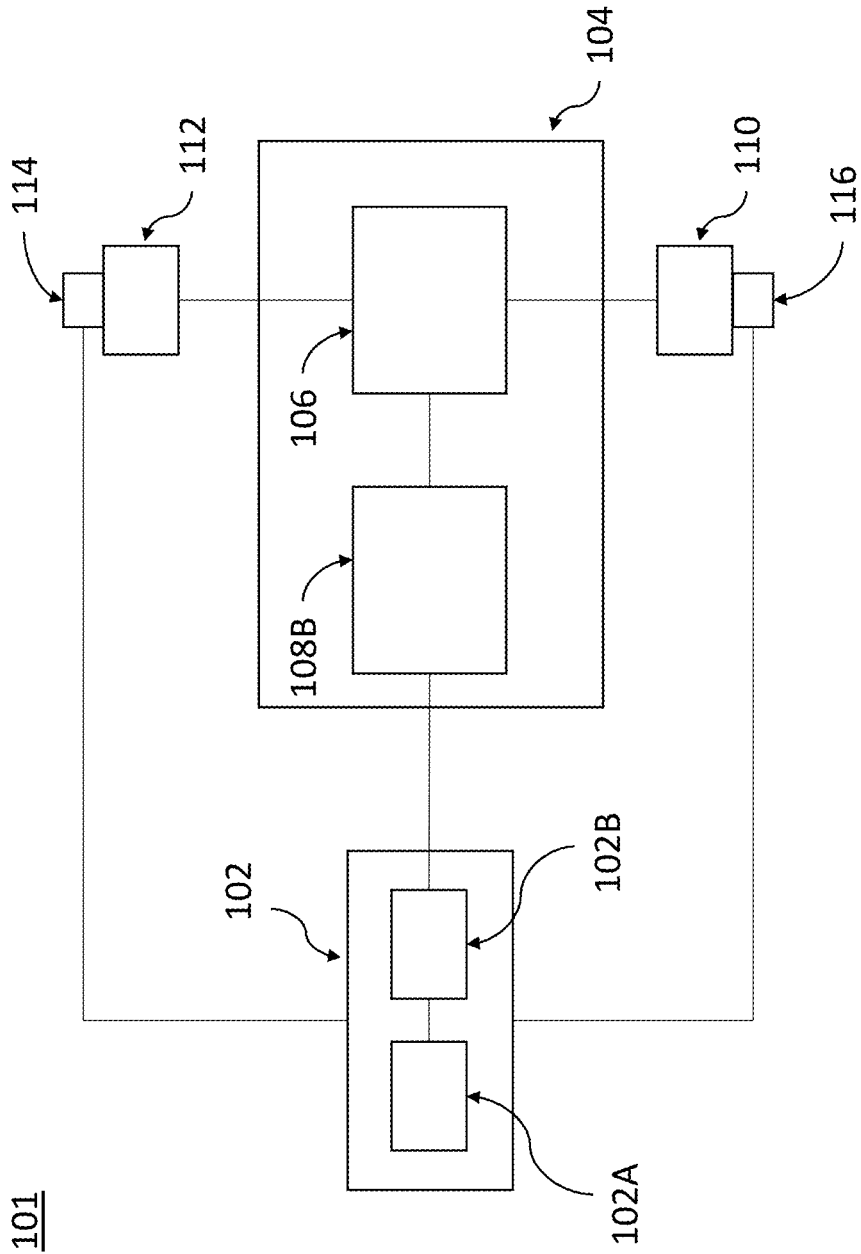
FIG. 1B is a schematic illustration of another thermal control system according to another embodiment.
Figure 1C:
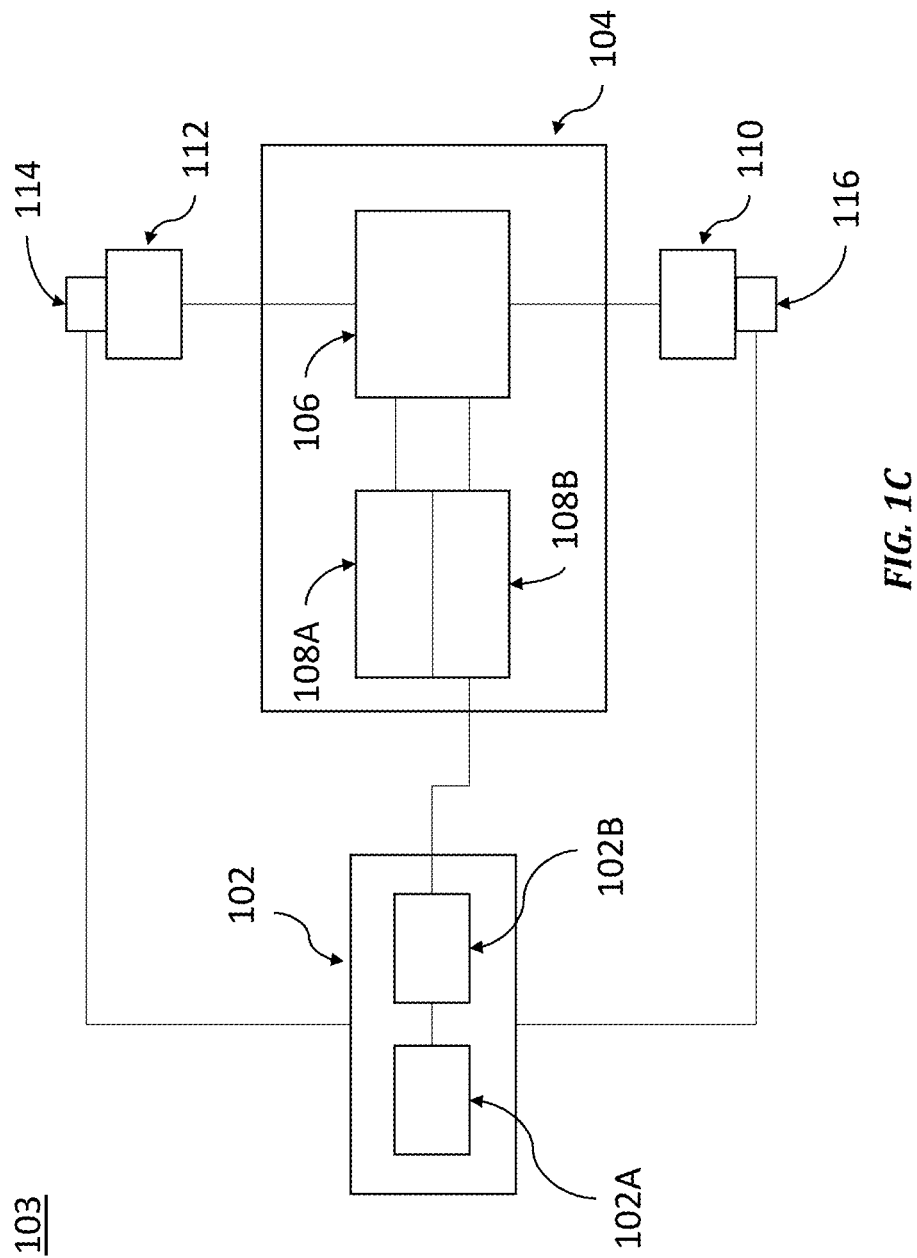
FIG. 1C is a schematic illustration of another thermal control system according to yet another embodiment.

In general, the thermal control systems described below can be divided into three categories: passive systems, active systems, and combined systems. FIG. 1A illustrates a passive system according to one embodiment. FIG. 1B illustrates an active system according to one embodiment. FIG. 1C illustrates a combined system according to one embodiment.

FIG. 1A illustrates a thermal control system that includes a heat source 112 connected to a heat sink 110 through a metamaterial unit 106. As explained below, metamaterial unit 106 may operate in different states with different thermal conductivities. Thus, the amount of heat that flows from source 112 to sink 110 is dependent upon the state in which metamaterial unit 106 operates. In the embodiment shown in FIG. 1A, metamaterial unit 106 operates in a passive manner. In other words, the state in which metamaterial unit 106 operates is determined by the amount of heat from source 112. More specifically, a passive load inducer 108A operates based on the amount of heat from source 112 to cause a change in metamaterial unit 106 thereby altering the thermal conductivity of metamaterial unit 106, as explained in further detail below. No additional external input (e.g., a force or local heating) is required for metamaterial unit 106 to operate in a passive mode.

FIG. 1B is a schematic view of a thermal control system 101 according to another embodiment that operates in an active manner. Here, the metamaterial unit 106 is part of a thermal transfer unit 104 that includes an active load inducer 108B. Load inducer 108B is constructed to apply a load to the metamaterial unit 106 that causes the thermal conductivity of metamaterial unit 106 to change. Load inducer 108B may apply a mechanical load (e.g., a force), a thermal load (e.g., local heating), or an electrical load (e.g., electrical current) to induce a change in the conductivity state of metamaterial unit 106. The load applied by load inducer 108B may be in response to an instruction from a processor 102.

Processor 102 includes a memory 102A communicatively connected to a CPU 102B. Memory 102A includes a control program that, when executed by CPU 102B, causes processor 102 to control the load inducer 108B in a number of different ways. For example, in FIG. 1B, processor 102 receives signals from temperature probes 114 and 116 which are disposed on or near a heat source 112 and a heat sink 110, respectively. In another embodiment, where load inducer 108B applies a mechanical load to metamaterial unit 106, strain or pressure gauges may be included with thermal transfer unit 104 to monitor the mechanical load applied to metamaterial unit 106. The readouts from the strain or pressure gauges may be provided to processor 102 which, in turn, may cause the load applied to metamaterial unit 106 to vary to produce different thermal conductivities. In another embodiment, where load inducer 108B applies an electrical load to metamaterial unit 106, current and voltage sensors may be included in thermal transfer unit 104 to monitor the load applied to the metamaterial unit 106. The readouts from the current and voltage sensors may be provided to processor 102 which, in turn, may cause the load applied to metamaterial unit 106 to vary to produce a different thermal conductivities. In yet another embodiment, processor 102 may be controlled remotely by a user or another processor to generate a control signal for load inducer 108B, and thereby change the thermal conductivity of metamaterial 106, independently of the readouts from any probes, gauges, or sensors.

FIG. 1C is a schematic view of a thermal control system 103 that operates in both a passive and an active manner as a combined system. FIG. 1C is substantially similar to FIG. 1B, except both a passive load inducer 108A and an active load inducer 108B are provided. As described above, passive load inducer 108A operates based on the temperature applied to metamaterial unit 106, while the active load inducer 108B operates in accordance with a control signal from processor 102. In one mode of operation, the passive load inducer 108A may function continuously based on the temperature of source 112. As discussed in greater detail below, the passive load may be applied in a variety of ways by utilizing, for example, coefficient of thermal expansion changes, shape memory alloys, or other temperature sensitive systems. As discussed below, this may allow the thermal control system 103 to operate in a stable zone. However, the inclusion of the active load inducer 108B, allows for additional control of the system 103 based on the readouts of probes, gauges, or sensors or based on external user or processor control. Having described the features of the passive system 100, the active system 101, and the combined system 103, attention will now be directed to the features of metamaterial unit 106, with references to FIGS. 1D, 2A, and 2B.

Figure 1D:
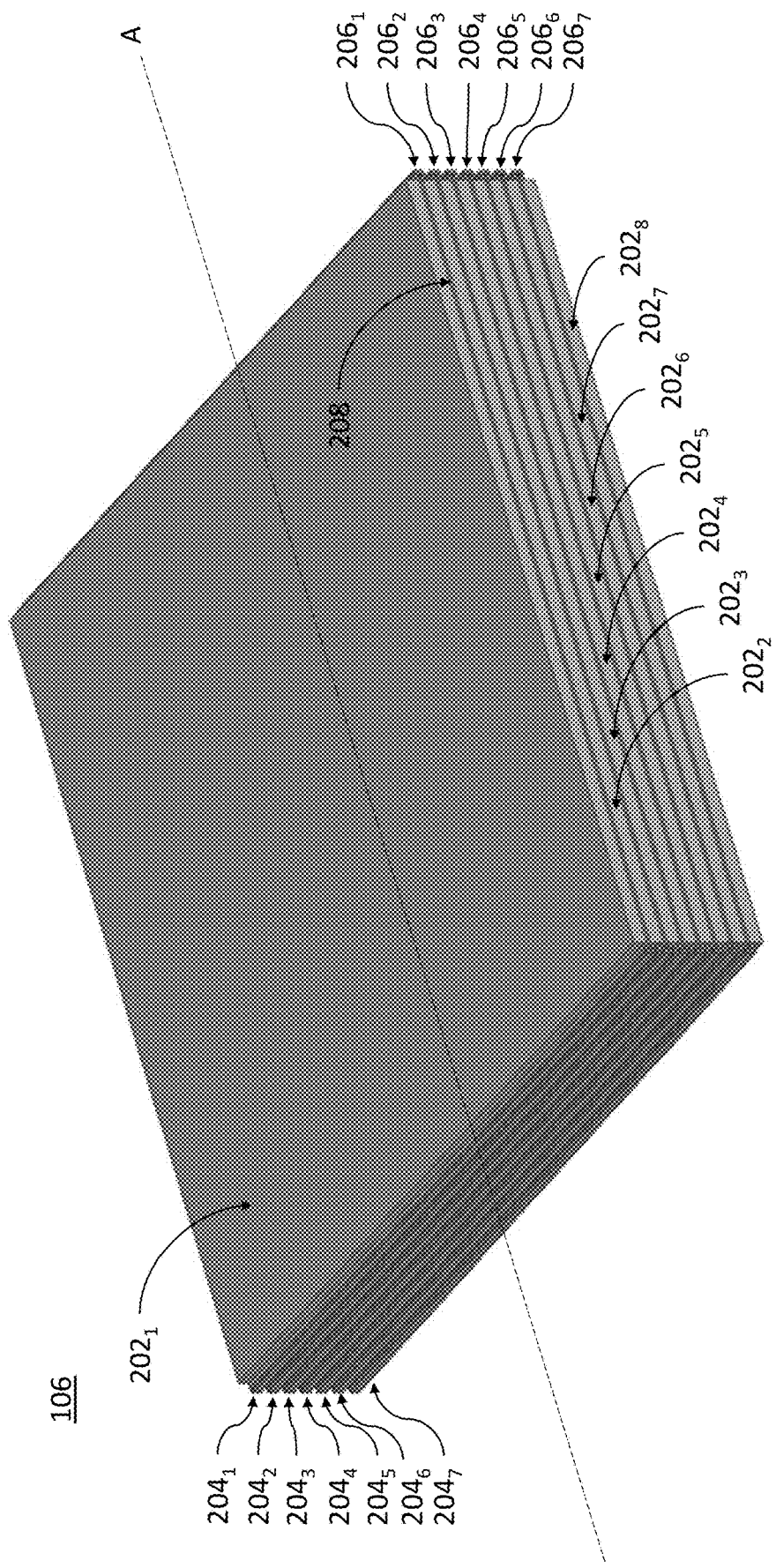
FIG. 1D is a perspective view of a metamaterial unit according to one embodiment.

FIG. 1D is a perspective view of metamaterial unit 106 according to an exemplary embodiment. In the embodiment shown in FIG. 1B, metamaterial unit 106 includes a plurality of plates $202_1 \ldots 202_8$ (in general $202_i$), a plurality of first bonds $204_1 \ldots 204_7$ (in general $204_i$), and a plurality of second bonds $206_1 \ldots 206_7$ (in general $206_i$). Plates $202_i$ are formed by a high thermal conductivity material, such as metal. To maximize the range of thermal conductivity control, metals including copper, gold, platinum, aluminum, and alloys thereof can be used. Of course, a less thermally conductive material could be used to design a specific range of thermal conductivity; however, the ability of metamaterial unit 106 to transfer heat would be correspondingly reduced. The first bonds $204_i$ and second bonds $206_i$ are formed from a low thermal conductivity material. In a preferred embodiment, the first bonds $204_i$ and $206_i$ are also formed from a flexible material such that when plates $202_i$ are moved or distorted (as discussed below), bonds $204_i$ and $206_i$ do not break, but rather remain connected to plates $202_i$. In a preferred embodiment, bonds $204_i$ and $206_i$ are formed from a low thermal conductivity epoxy. The dimensions of plates $202_i$ in the x, y, and z directions may be determined based on the needs of the system into which metamaterial unit 106 is placed.

In the embodiment illustrated in FIG. 1D, bonds $204_i$ and $206_i$ are attached to opposite peripheral edges of plates $202_i$. Each bond $204_i$ and $206_i$ connects two plates $202_i$ and $202_{i+1}$ to provide a first thermal pathway between plates $202_i$ and $202_{i+1}$. However, due to the low thermal conductivity of the material used to form bonds $204_i$ and $206_i$, little heat is transferred from plates $202_i$ to plates $202_{i+1}$ through this first thermal pathway. As explained in further detail, plates $202_i$ and $202_{i+1}$ may be adjusted into one of three states: non-contact, partial-contact, and full-contact. In the non-contact state, plates $202_i$ and $202_{i+1}$ do not touch directly. Thus, the only thermally conductive path is the first thermal pathway, as a gap exists between plates $202_i$ and $202_{i+1}$. Of course, heat may still be transferred by radiation based on the surface emissivity of plates $202_i$ and $202_{i+1}$. In one embodiment, the gap may be an air gap. In another embodiment, the gap may be a vacuum. In yet another embodiment, a gas (e.g., argon) may be provided to fill the gap. In one embodiment, the gap between plates $202_i$ and $202_{i+1}$ may be approximately 0.25 mm. The thermal conductivity of metamaterial unit 106 in a non-contact state, where heat is transferred through the first thermal pathway, is on the order of $10^{-3}$ W/m*K. However, in the full-contact state, where the gap between plates $202_i$ and $202_{i+1}$ is eliminated, the thermal conductivity is on the order of $10^2$-$10^3$ W/m*K. As explained below, by controlling the amount of contact between plates $202_i$ and $202_{i+1}$, the thermal conductivity of metamaterial unit 106 may be controlled to be between these two extremes, as explained below.

Figure 2A:
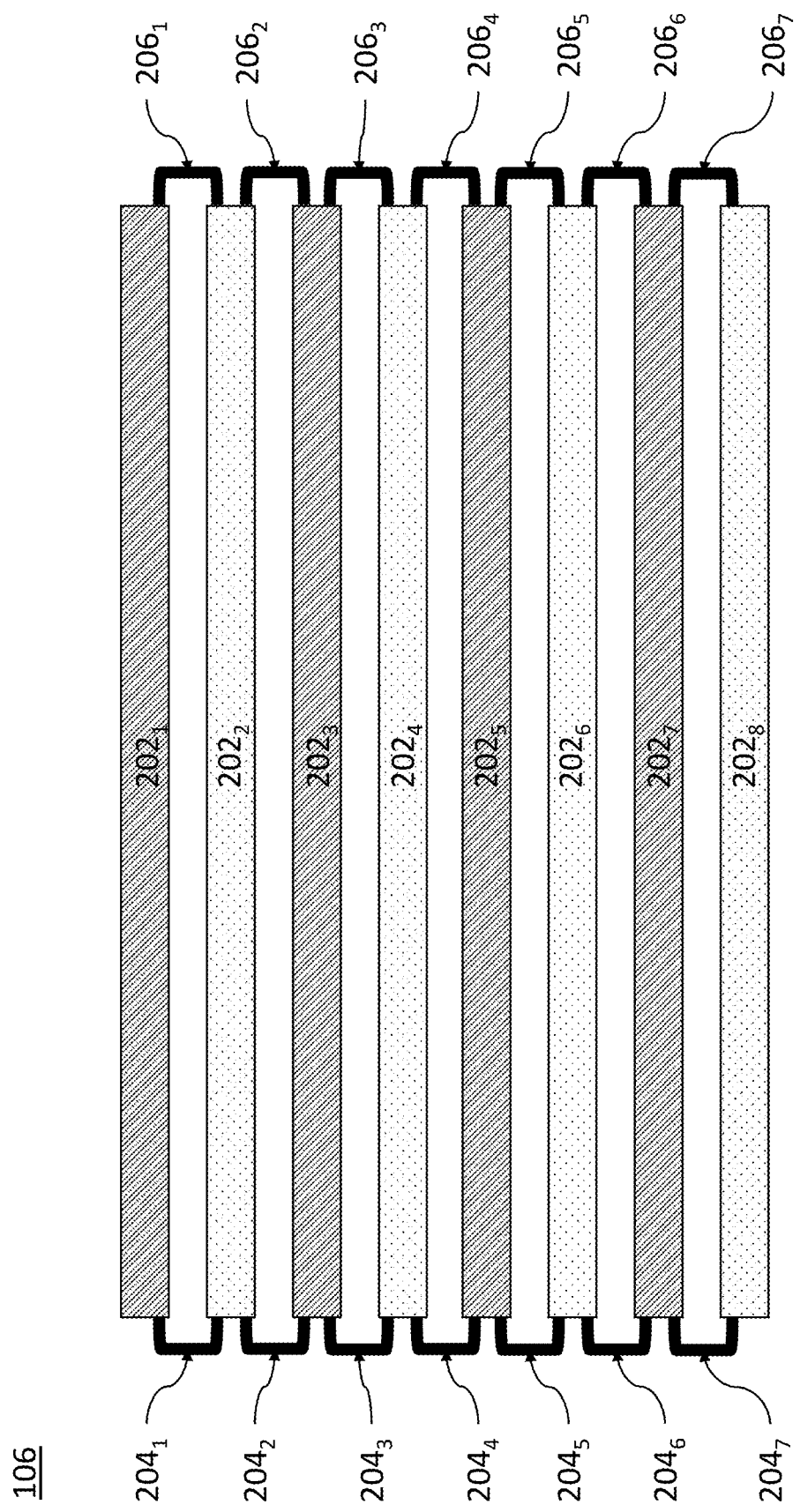
FIG. 2A is a cross-sectional view of a metamaterial unit according to another embodiment in a non-contact state.
Figure 2B:
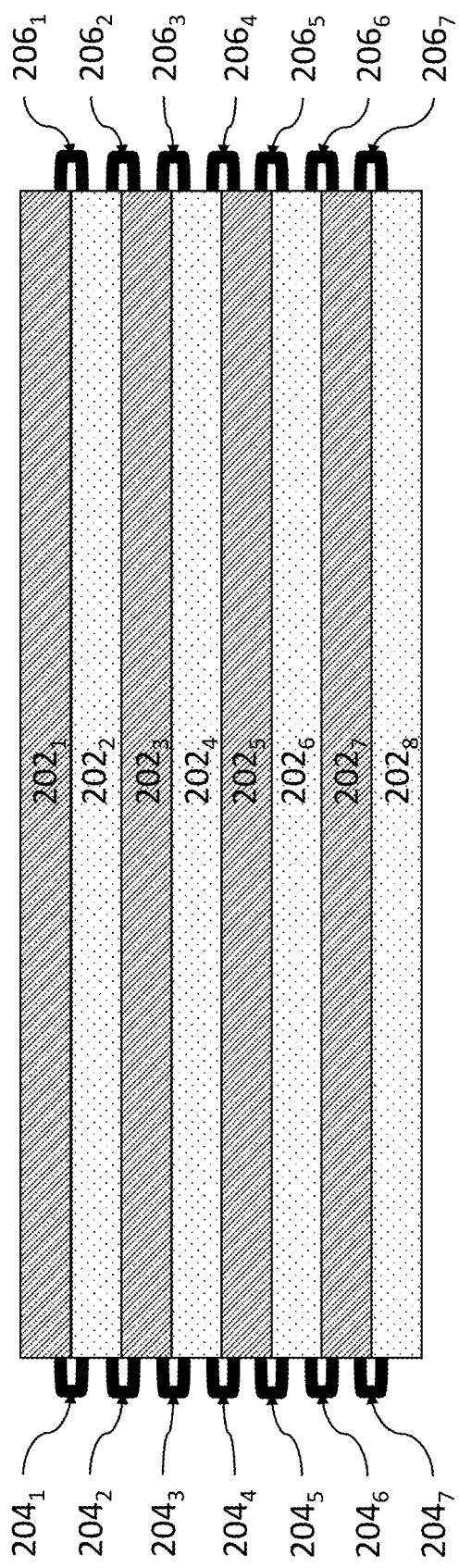
FIG. 2B is a cross-sectional view of a metamaterial unit shown in FIG. 2A in a full-contact state.

FIGS. 2A and 2B are cross-sectional views of metamaterial unit 106 taken along axis A in FIG. 1D. In FIG. 2A, the metamaterial unit 106 is in a non-contact state where each of plates $201_1 \ldots 201_8$ are separated by an air gap. While eight plates are shown in FIGS. 2A and 2B, that is merely exemplary. Any number of plates could be provided. In FIG. 2B, the metamaterial unit 206 is in a full-contact state where the air gaps between the plates $201_i$ are entirely eliminated. As discussed above, in the non-contact state (FIG. 2A), thermal conduction occurs through the first thermal pathway established by bonds $204_i$ and $206_i$. Since bonds $204_i$ and $206_i$ exhibit low thermal conductivity, the thermal conductivity of the metamaterial unit 106 is correspondingly low. However, in the full-contact state shown in FIG. 2B, the plates $202_i$ have been brought into a maximum state of contact. That is, the tops and the bottoms of plates $202_2 \ldots 202_7$, the bottom of plate $202_1$, and the top of plate $202_8$ are in full contact with an adjoining plate $202_i$, thus establishing a second thermal pathway through plates $202_1 \ldots 202_8$. Due to the maximum surface contact area and the higher thermal conductivity of the plates $202_i$, the second thermal pathway through plates $202_1 \ldots 202_8$ provides a maximum amount of thermal conductivity for metamaterial unit 106.

As discussed above, load inducers 108A and 108B are constructed to cause metamaterial unit 106 to go between the non-contact state and the full-contact state. Load inducers 108A and 108B may be implemented in different ways.

For the passive load inducer 108A, thermally sensitive materials like shape memory alloys and bimetal springs may be used, as illustrated in FIGS. 2C and 2D. FIG. 2C is a substantial the same as FIG. 2A, except the elements of passive load inducer 108A, according to one embodiment, are shown. Load inducer 108A includes two contact pads 208A and 208B which are connected by a connecting element 210. The contact pads 208A and 208B provide for a connections between the top plate $202_1$ and the bottom plate $202_8$. Contact pads 208A and 208B are preferable formed from a thermally conductive material, such as metal. The connecting element 210 may be formed by a material that deforms when heat is applied. Heat from source 112 is applied to contact pad 208A. Contact pad 208B is in thermal contact with sink 110, and thus heat is permitted to flow along the connecting element 210 from the source 112 to the sink 110. If the connecting element 210 is formed from a bimetal spring, then the heat from source 112 will cause the bimetal spring to bend. As one skilled in the art will recognize, a bimetal spring comprises two metals with different coefficients of thermal expansion (CTE) joined together. When heat is applied to the bimetal spring, one of the metals expands more than the other, causing the bimetal spring to bend. As a result, when a sufficient temperature differential exists between the source 112 and the sink 110, the connecting element 210 may bend causing the plates $202_1 \ldots 202_8$ to be brought into the full-contact state, as illustrated in FIG. 2D. The bimetal spring should have sufficient CTE mismatches to produce a force sufficient to overcome the resistance of bonds $204_i$ and $206_i$ and cause plates $202_i$ (of the desired dimensions and weight for the system in question) to enter the full-contact state at the desired temperature. Alternatively, connecting element 210 may be formed from a shape memory alloy. Shape memory alloys return to their original shape when heat is applied. Thus, if the original shape represents a bent state, when sufficient heat from source 112 is applied, the shape memory alloy will bend to produce the full-contact state shown in FIG. 2D. Having describe different embodiments of the passive load inducer 108A, attention will now be directed to active load inducers 108B.

Active load inducers 108B may be in the form of a mechanical system designed to compress contact plates 214A and 214B, or an additional thermal source that adds heat to the connecting element 210 discussed above to force a change in the thermal conductivity of metamaterial unit 106. Magnetic or electro-active polymers may also be used a connecting element 210, and can be directly activated by an electric current or magnetic field generated under the control of processor 102. These polymers, when activated, contract and induce a load upon the metamaterial unit 106. In one embodiment, a mechanical press 212 is provided that operates in accordance with the instruction from CPU 102, to cause the contacts plates 214A and 214B to compress the top of plate $202_1$ and the bottom of plate $202_8$, respectively, thereby overcoming the resistance of bonds $204_i$ and $206_i$ and causing plates $202_1$ and $202_8$ to be compressed into the full-contact state, as shown in FIG. 2F. In a similar manner, in accordance with an instruction from CPU 102 to enter the non-contact state from the full-contact state, active load inducer 108B may cause the two contact plates to expand, as illustrated in FIG. 2E. Without the pressure from the contact plates 214A and 214B, bonds $204_i$ and $206_i$ will relax to their normal state causing plates $202_i$ to separate from each other.

Systems 100 and 101 may both be operated in manner that maintains a temperature in source 112 at or near a desired value. For example, connecting element 210 may be selected such that, in a passive system 100, plates $202_i$ are caused to enter a full-contact state a predetermined threshold temperature, without any external command. The resulting increase in thermal conductivity of metamaterial unit 106 will cause an increase in heat flux from source 112 to sink 110, resulting in a drop in temperature of source 112. If the temperature drops below the threshold temperature, then the connecting element 210 will expand and the plates $202_i$ will return to a non-contact state. The resulting decrease in thermal conductivity of metamaterial unit 106 will mitigate the flow of heat from source 112, thus causing an increase in temperature in source 112 and the process will repeat again. Thus, by balancing the generation of heat in source 112 with the activation temperature of the connecting element 210, it is possible to maintain source 112 within a range of a predetermined temperature without external control. The extent of the range will be dependent upon the properties of the materials (e.g. connecting element 210) used in the system. In a similar manner, in the case of an active system 101, processor 102 may receive signals from a temperature probe 114 (e.g., a thermocouple) connected to source 114 or proximate thereto, and issue control signals once a predetermined temperature is reached to cause the active load inducer 108B to contract or expand plates $202_i$.

Figure 2G:
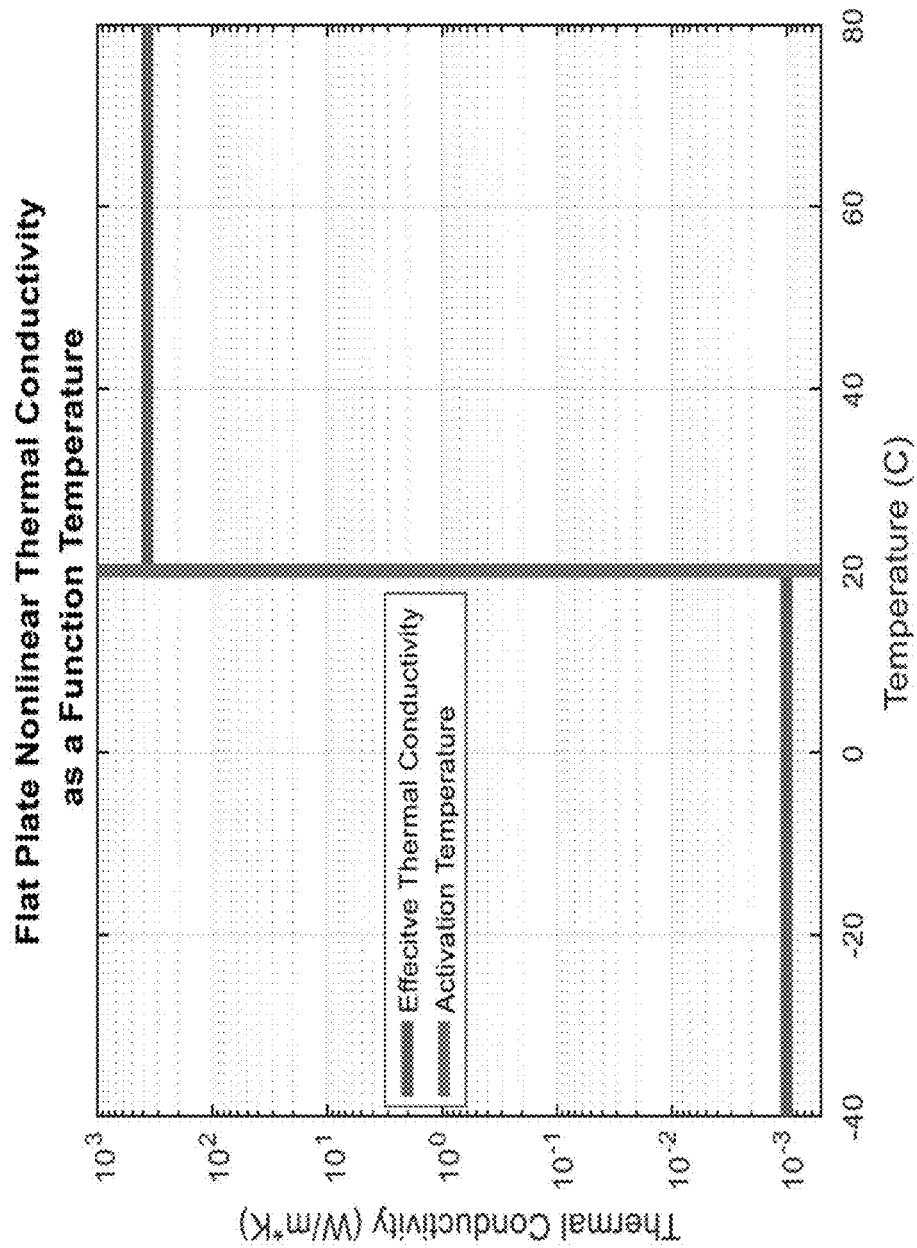
FIG. 2G is graph of thermal conductivity versus temperature for the metamaterial unit according to one embodiment.

FIG. 2G is a graph of thermal conductivity versus temperature for a thermal control systems 100, 101, and 103, described above that employs a metamaterial unit 106 that operates between a non-contact state and a full-contact state. As shown in FIG. 2G, when the threshold temperature of 20° C. is reached, the metamaterial unit 106 enters the full-contact (whether a passive, active, or combined system) state, and the thermal conductivity of metamaterial unit 106 increases by over five orders of magnitude. Of course, as discussed above, the threshold temperature of 20° C. is exemplary and may be any value dependent on the system and the materials used.

The metamaterial unit 106 discussed above functions in a similar manner to a thermal switch with on-off states corresponding to the full-contact and non-contact states, respectively. However, as discussed below, the contact area between two adjoining plates $202_i$ and $202_{i+1}$ may also be controlled such that adjoining plates are in state of partial-contact. As a result, the thermal conductivity of a metamaterial unit 306 may be correspondingly controlled, as explained below in FIGS. 3A-5B.

Figure 3A:
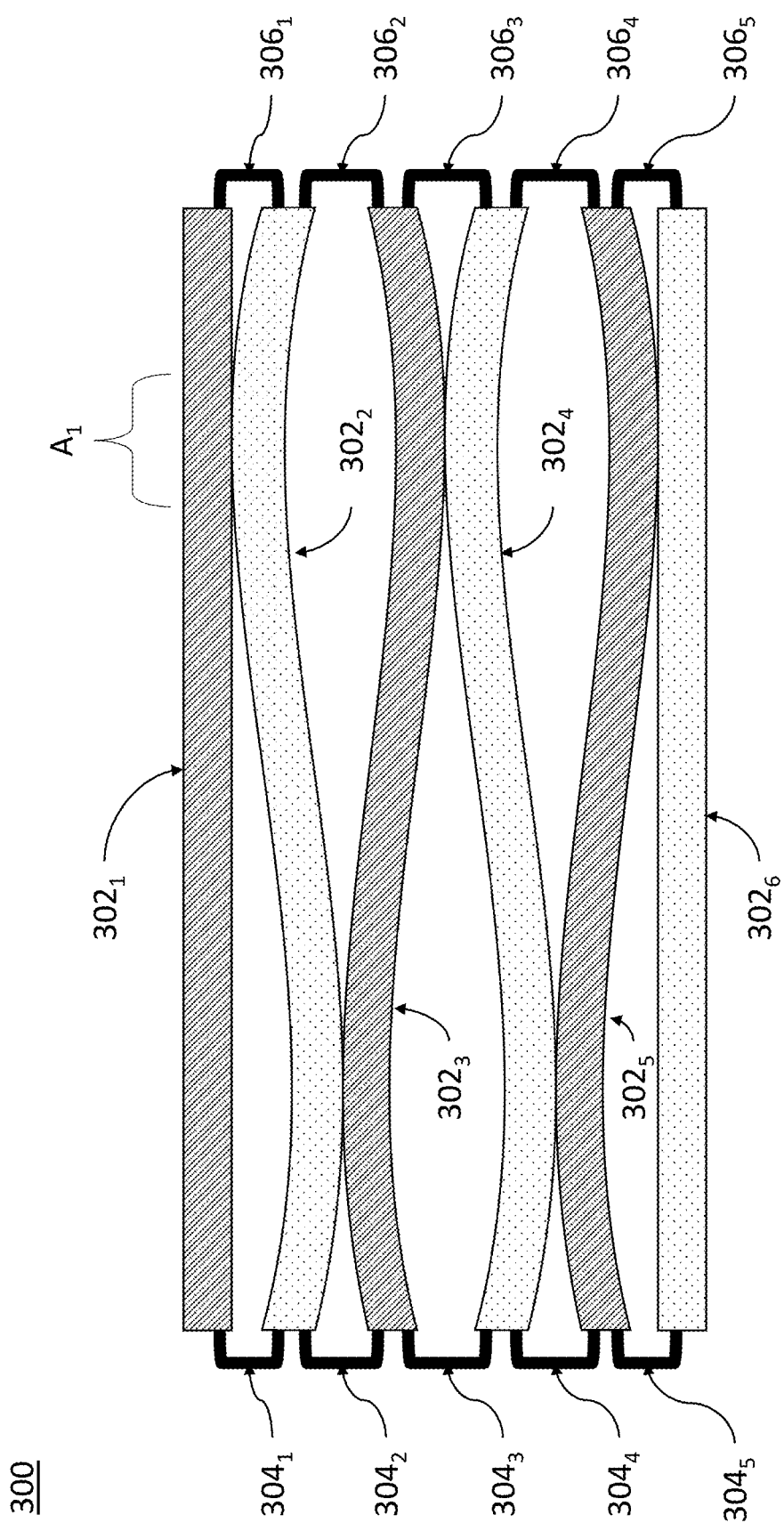
FIG. 3A is a cross-sectional view of another metamaterial unit according to one embodiment in a partial-contact state.
Figure 3B:
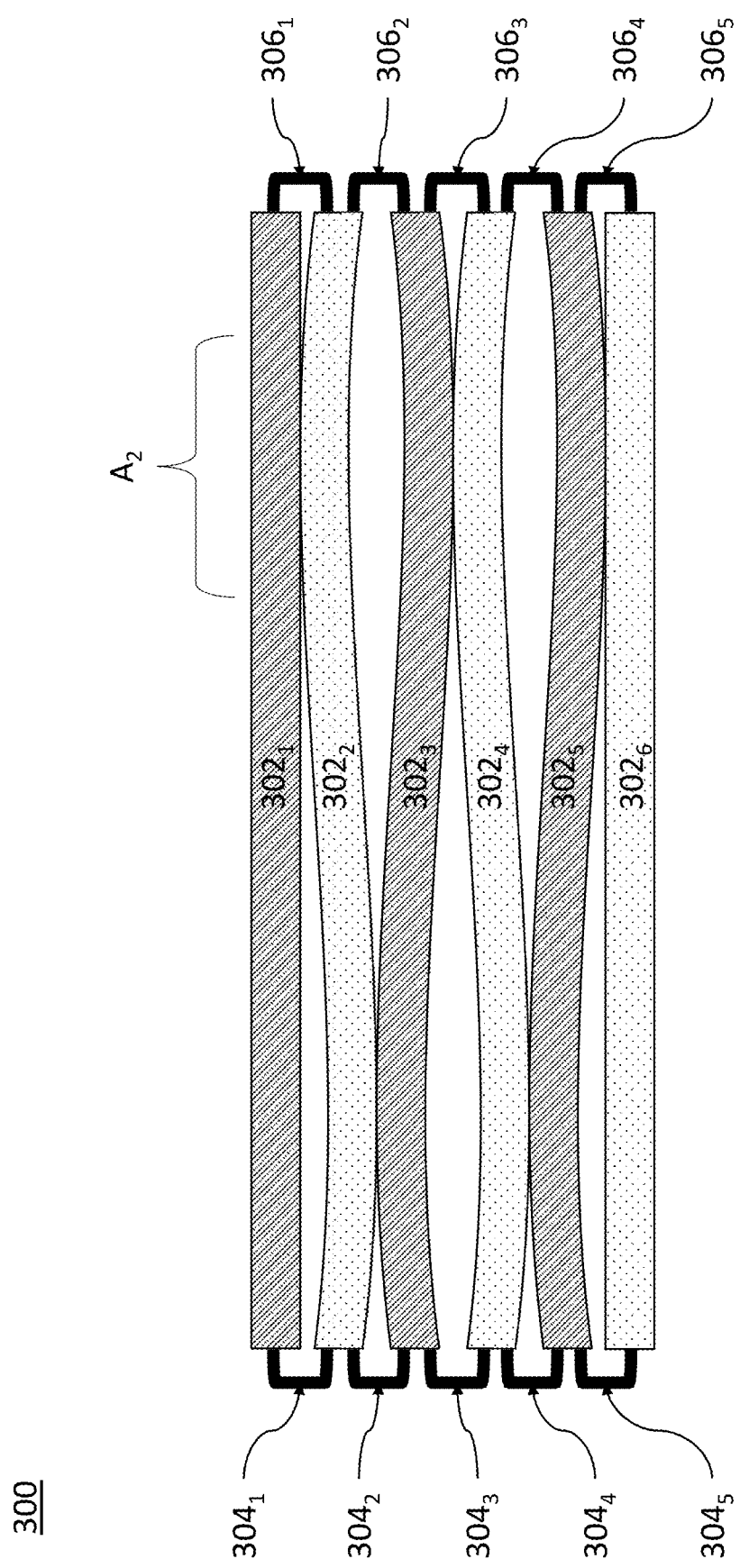
FIG. 3B is a cross-sectional view of the metamaterial unit in FIG. 3A in another partial-contact state.
Figure 3C:
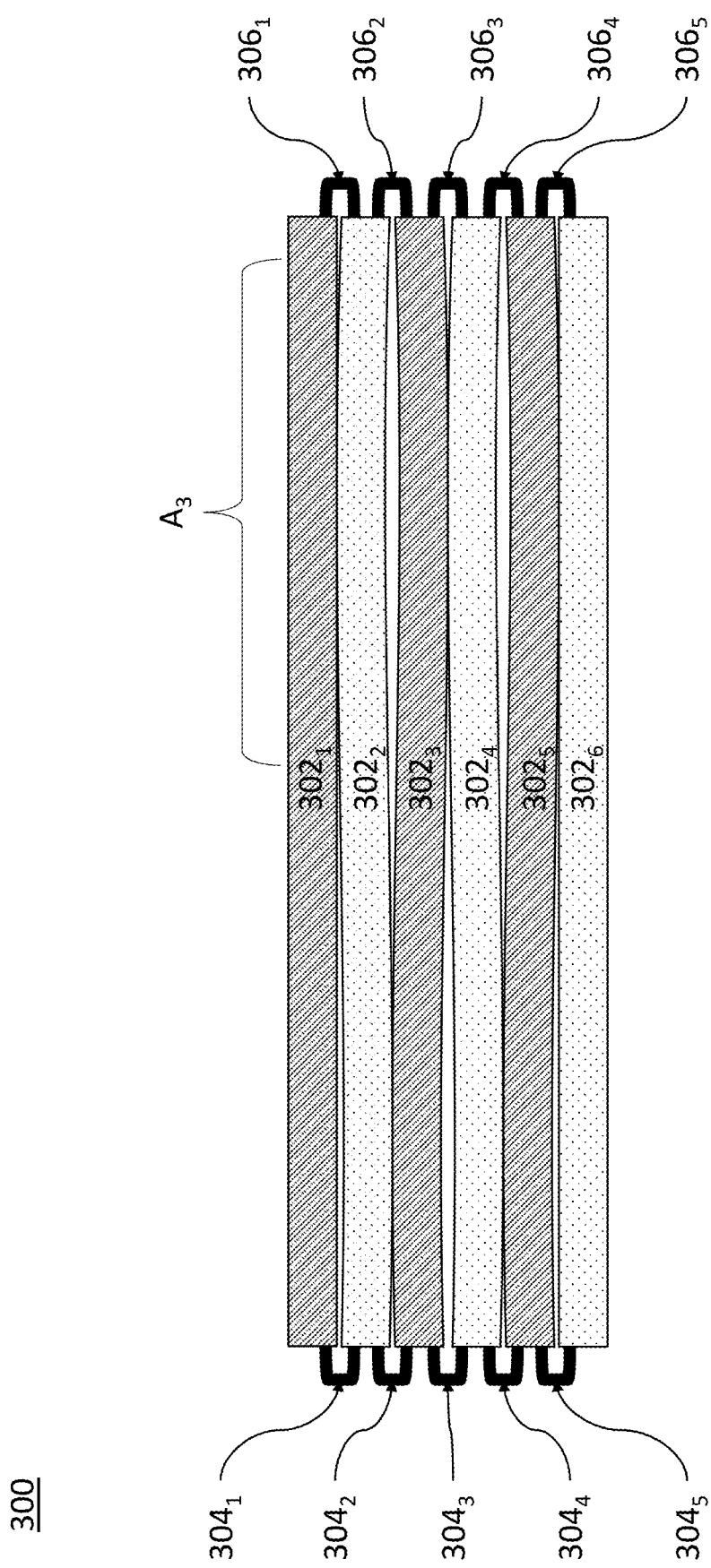
FIG. 3C is a cross-sectional view of the metamaterial unit in FIG. 3A in yet another partial-contact state.

FIG. 3A shows a metamaterial unit 300 according to another embodiment. In this embodiment, the interior plates ($302_2 \ldots 302_5$ in FIG. 3A) are constructed to have a controlled surface distortion in an unloaded state, such that as the system is compressed a variable contact area as a function of load can be generated. More specifically, the interior plates $302_2 \ldots 302_5$ may take the shape of a sine wave, the amplitude of which determines the amount of contact between adjoining plates as a function of the applied load. For example, in FIG. 3A, plate $302_2$ has a contact area $A_1$ with the adjoining plate above, plate $302_1$. In one embodiment, this may represent an unloaded state, where a load inducer (either 108A or 108B) does not apply a load to metamaterial unit 106. As a load is applied or increased, the contact area $A_1$ correspondingly increases resulting in $A_2$ in FIG. 3B. As the load continues to increase the contact area increases to $A_3$ as seen in FIG. 3C. When the applied load is sufficient to flatten the plate such that the amplitude of the sinusoidal shape is zero, then plate $302_2$ is flat and the contact area $A_i$ reaches a maximum amount. This process is illustrated in FIGS. 3B and 3C. In FIG. 3B, the interior plates $302_2 \ldots 302_5$ are curved, but the degree of curvature is less than in FIG. 3A. As a result, the contact area $A_2$ between plates $302_1$ and $302_2$ is greater than contact area $A_1$ in FIG. 3A. In FIG. 3C, the interior plates $302_2 \ldots 302_5$ are curved to an even lesser degree than in FIG. 3B. As a result, the contact area $A_3$ between plates $302_1$ and $302_2$ in FIG. 3C is greater than contacts areas $A_1$ and $A_2$ in FIGS. 3A and 3B, respectively. As the contact area $A_i$ (between two general plates $302_i$ and $302_{i+1}$) increases the thermal conductivity of the metamaterial unit 106 increases as well. By controlling contact area $A_i$, the thermal conductivity of metamaterial unit 106 can be controlled.

Figure 4A:
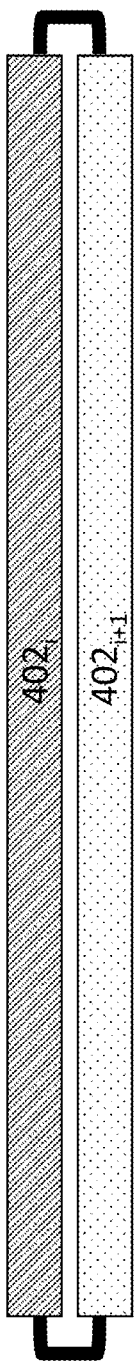
FIGS. 4A-4D show various contacts states for two thermally conductive plates according to one embodiment.
Figure 4B:
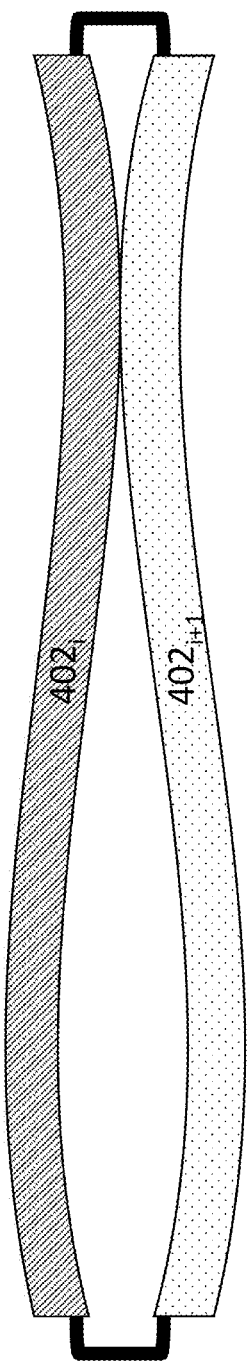
Figure 4C:
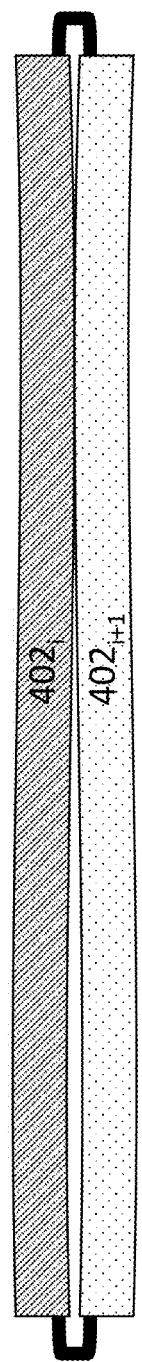
Figure 4D:
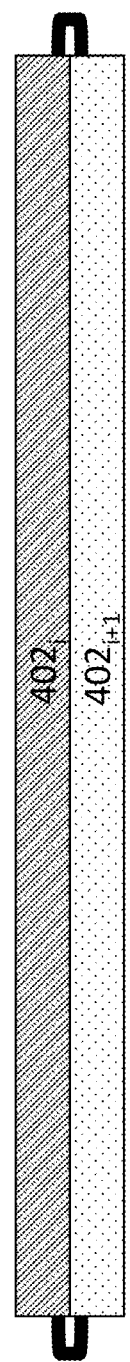

FIGS. 4A-D illustrate exemplary contact states between two generic interior plates $402_i$ and $402_{i+1}$ in a metamaterial unit 400. For brevity, only two interior plates are shown $402_i$ and $402_{i+1}$. However, as one of ordinary skill will recognize, plates $402_i$ and $402_{i+1}$ may be part of a metamaterial unit that includes additional plates that are controllable in the same manner. In FIG. 4A, plates $402_i$ and $402_{i+1}$ are in a non-contact state. In one embodiment, curved plates may be induced into a flat, non-contacting state (FIG. 4A), by application of electrical current or heat from a load inducer. Removal of the same may be used to induce the partial-contact state shown in FIG. 4B, where plates $402_i$ and $402_{i+1}$ are in a partial-contact state. Alternatively, plates $402_i$ and $402_{i+1}$ may rest in a partial-contact state (FIG. 4B) when no load is applied. Either way, a mechanical press or other load inducer 108B may be used to compress the plates $402_i$ and $402_{i+1}$ from the partial contact state shown in FIG. 4B to another partial contact state (FIG. 4C) where the contact area is greater than in FIG. 4B. In FIG. 4D, plates $402_i$ and $402_{i+1}$ are in a full-contact state.

Plates $302_i$ and $302_{i+1}$ (as well as plates $202_i$ and $402_j$) may be formed from a flexible thermally conductive material, such as a metal. The plate's distortions, such as a sine wave, can be designed to meet the desired conductivity as a function of load. The design of the initial plate distortions and the material selection needs to balance the thermal conductivity along with the elastic behavior of the material such that as the system is loaded, the plates can be flattened, and as the load is released the plate returns elastically to the unloaded geometry. As one skill in the art will appreciate, the design of the unloaded plate geometry needs to be such that the plates when unloaded will return to their unloaded configuration.

Table 1 illustrates test results on a metamaterial unit 300 controlled to vary the contact area $A_i$ between plates $302_i$. The tested metamaterial unit 300 includes eight copper plates with individual thicknesses of approximately 1 mm. In the non-contact state, the air gap between the plates is 0.25 mm. One (1.0) watt of power was applied to the source 112 to create heat, while the sink 114 was held at a constant temperature of 1.0° C. A load was applied to vary the contact area $A_i$. That load was adjusted to vary the thermal conductivity of the metamaterial unit 300.

TABLE 1

| Contact Area (mm$^2$) | Temperature Differential ($\Delta T$) | Thermal Conductivity (W/m*K) | Stiffness (N/M) |
|---|---|---|---|
| 0 | 2049 K | 0.001 | $2.5 \times 10^6$ |
| Point contact | 9.142 K | 0.267 | $4.2 \times 10^6$ |
| 2 | 8.572 K | 0.2829 | $4.4 \times 10^6$ |
| 8 | 6.873 K | 0.344 | $5.2 \times 10^6$ |
| 24 | 2.536 K | 0.7659 | $14.8 \times 10^6$ |
| Full contact | 0.994 K | 370.4 | $2.7 \times 10^{11}$ |

As shown in Table 1 (which corresponds to FIG. 5A), as the applied load changes the contact area $A_i$ between the plates increases, the thermal conductivity of the metamaterial unit 300 increases as well. However, as graphically illustrated in FIG. 5A, the rate of increase is non-linear. Moreover, between point contact and 24 mm$^2$ of contact area, the thermal conductivity of metamaterial unit 300 is within approximately 0.5 W/m*K. Thus, there is a large range of contact areas that allow for precision control of the thermal conductivity of metamaterial unit 300.

Figure 5A:
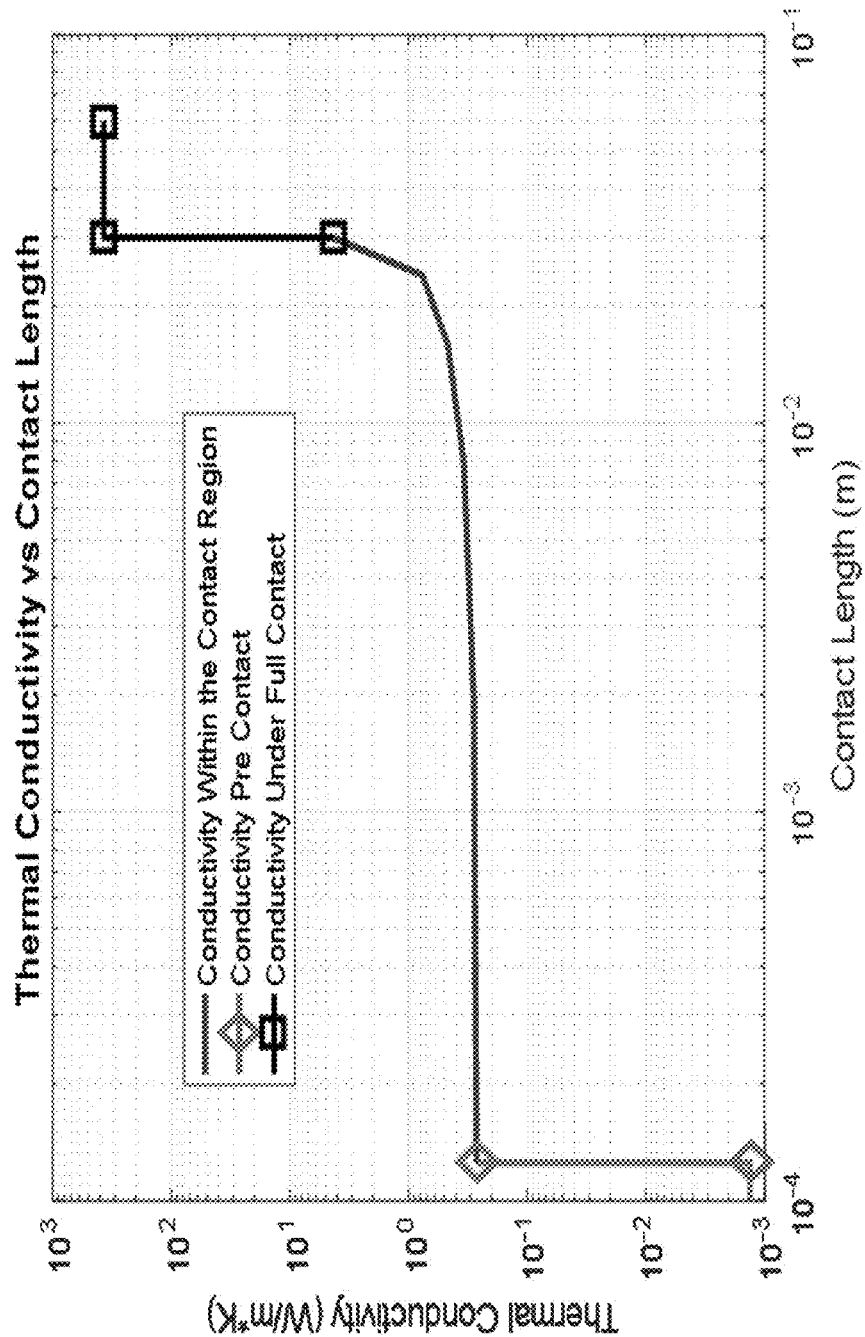
FIG. 5A is a graph of thermal conductivity versus contact area for a metamaterial unit according to one embodiment.
Figure 5B:
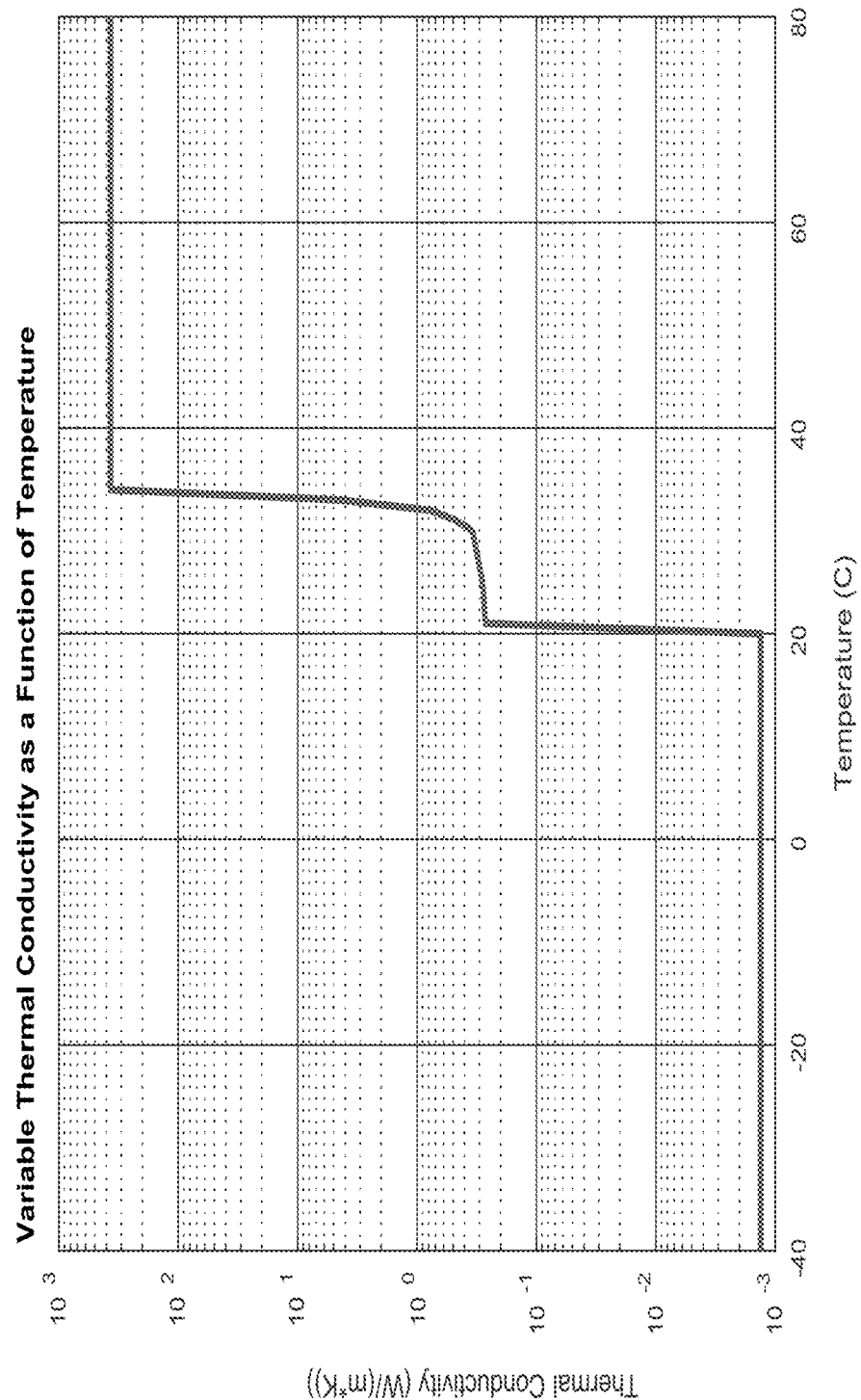
FIG. 5B is a graph of thermal conductivity versus contact area for a metamaterial unit according to one embodiment.

In one embodiment, the metamaterial unit 300 can be activated passively by tuning the system to respond to temperature at source 112 such that a passive load inducer 108A adjusts the contact area of plates $302_i$ such that the thermal conductivity of metamaterial unit 106 varies as a function of temperature at source 112. An example of a passive metamaterial response as a function of temperature can be seen in FIG. 5B. FIG. 5B is a graph of thermal conductivity versus temperature for an exemplary metamaterial unit 300 that is constructed to operate in a non-contact state, a full-contact state, and a plurality of partial-contact states. Like in FIGS. 2C and 2D, a passive load inducer 108A may be used to cause plates $302_i$ to have increased or decreased contact area based on temperature at source 112, thus varying the thermal conductivity of metamaterial unit 300. As shown in FIG. 5B, metamaterial unit 300 may operate in a non-contact state until a temperature of 20° C. is reached, at which the load inducer 108A (e.g., a bimetal spring or shape memory alloy) causes the plates $302_i$ to enter a partial contact state. As the temperature increases within a zone from 20° C. to 35° C., the load inducer 108A may apply a further load on plates $302_i$ resulting in increased contact area and incrementally higher thermal conductivity. At a temperature greater than 35° C., load inducer 108A causes plates $302_i$ to enter a full-contact state, where the thermal conductivity is a maximum value for the system.

As one of skill the art will appreciate, the same functionality may be achieved by an active system under the control of processor 102. Instead of the changes in contact states occurring as a result of heat (or the lack thereof) from source 112 causing passive load inducer 108A to act to alter the contact area of plates $302_i$, processor 102 may send a control signal to an active load inducer 108B based on temperature readings from one or more probes (e.g., probes 114 or 116).

One notable feature in FIG. 5B is the presence of a stability region between 20° C. and 35° C. Unlike FIG. 2G, where there is a near instantaneous change in thermal conductivity at 20° C., thermal conductivity of metamaterial unit 300 remains relatively stable between 20° C. and 35° C., thus providing points of stability in the system, as opposed to the constant flipping between two extreme states of on-and-off in FIG. 2G. Of course, the selections of 20° C. and 35° C. are merely exemplary, and could be wider thus providing even an even greater number of stability points. This stability region may arise under a passive or active system. In a passive system, the increase in temperature of source 112 will cause the passive load inducer 108A to increase the thermal conductivity of metamaterial unit 300. The increase in thermal conductivity of metamaterial unit 300 results in a greater transfer of heat from source 112 to sink 110 reducing the temperature of source 112. This causes a decrease in thermal conductivity of metamaterial unit 300, and thus a reduction in amount of heat transferred from source 112 to sink 110. The temperature in source 112 will increase once again, causing the cycle to repeat. Thus, the variable thermal conductivity of the metamaterial unit 300 allows for a stable operating region.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A thermal control system, comprising:
    a metamaterial unit that includes:
        a plurality of thermally conductive plates,
        a plurality of first bonds, wherein each first bond connects two adjoining thermally conductive plates, and
        a plurality of second bonds, wherein each second bond connects two adjoining thermally conductive plates;
    a load inducer constructed to cause the plurality of thermally conductive plates to move between a non-contact state, in which opposing surfaces of the plurality of thermally conductive plates are not in direct contact, to a contact state, in which the opposing surfaces of the plurality of thermally conductive plates are in at least partial direct contact, so as to change a thermal conductivity of the metamaterial unit from a first value to a second value,
    wherein two or more of the plurality of thermally conductive plates are curved in an unloaded state so as to contact adjoining thermally conductive plates.

2. The thermal control system according to claim 1, wherein the plurality of thermally conductive plates are metal plates.

3. The thermal control system according to claim 1, wherein the load inducer comprises: a first contact pad, a second contact pad, and a connecting element connecting the plurality of contact pads,
    wherein the first contact pad is attached to a surface of a first thermally conductive plate,
    wherein the second contact pad is attached to a surface of a second thermally conductive plate, different from the first thermally conductive plate, and
    wherein the connecting element is constructed to bend when heat is applied thereto so as to cause the plurality of thermally conductive plates to move from the non-contact state to a full-contact state.

4. The thermal control system according to claim 3, wherein the connecting element comprises a bimetal spring.

5. The thermal control system according to claim 3, wherein the connecting element comprises a shape memory alloy.

6. The thermal control system according to claim 1, further comprising:
    a processor; and
    a memory that stores a control program that, when executed by the processor, causes the processor to issue control signals to the load inducer to change the metamaterial unit from a non-contact state to at least a partial contact state.

7. The thermal control system according to claim 1, wherein the load inducer is constructed to cause the plurality of thermally conductive plates to move between a contact state and a non-contact state such that a temperature of a heat source thermally connected to the load inducer is held at a substantially constant temperature.

8. A thermal control system, comprising:
    a metamaterial unit that includes:
        a plurality of thermally conductive plates,
        a plurality of first bonds, wherein each first bond connects two adjoining thermally conductive plates, and
        a plurality of second bonds, wherein each second bond connects two adjoining thermally conductive plates;
    a load inducer constructed to cause the plurality of thermally conductive plates to move between:
        (i) an unloaded state, where no load is applied to the plurality of thermally conductive plates and in which opposing surfaces of the plurality of thermally conductive plates are in a first contact state, and
        (ii) a loaded state, where a load is applied to the plurality of thermally conductive plates and in which the opposing surfaces of the plurality of thermally conductive plates are in a second contact state where an area of contact between the opposing surfaces of the plurality of thermally conductive plates is greater than in the unloaded state, so as to change a thermal conductivity of the metamaterial unit from a first value to a second value, wherein two or more of the plurality of thermally conductive plates are curved in the unloaded state so as to contact adjoining thermally conductive plates.

9. The thermal control system according to claim 8, wherein the plurality of thermally conductive plates are metal plates.

10. The thermal control system according to claim 8, wherein the load inducer comprises: a first contact pad, a second contact pad, and a connecting element connecting the plurality of contact pads, wherein the first contact pad is attached to a surface of a first thermally conductive plate, wherein the second contact pad is attached to a surface of a second thermally conductive plate, different from the first thermally conductive plate, and wherein the connecting element is constructed to bend when heat is applied thereto so as to cause the plurality of thermally conductive plates to move from the unloaded state to the loaded state.

11. The thermal control system according to claim 10, wherein the connecting element comprises a bimetal spring.

12. The thermal control system according to claim 10, wherein the connecting element comprises a shape memory alloy.

13. The thermal control system according to claim 8, further comprising:

a processor; and a memory that stores a control program that, when executed by the processor, causes the processor to issue control signals to the load inducer to change the metamaterial unit from the unloaded state to the loaded state.

14. The thermal control system according to claim 8, wherein the load inducer is constructed to cause the plurality of thermally conductive plates to move between the unloaded state and the loaded state such that a temperature of a heat source thermally connected to the load inducer is held at a substantially constant temperature.

\* \* \* \* \*